United States Patent
Butler et al.

(10) Patent No.: US 10,093,565 B2
(45) Date of Patent: Oct. 9, 2018

(54) WATER STRAINING AND CHEMICAL ADDITIVE DEVICE FOR MARINE VESSELS AND RECREATIONAL VEHICLES

(71) Applicants: Philip Bryce Butler, Houston, TX (US); Garreth Scott Donaldson, Cape Town (ZA)

(72) Inventors: Philip Bryce Butler, Houston, TX (US); Garreth Scott Donaldson, Cape Town (ZA)

(*) Notice: Subject to any disclaimer, the term of this patent is extended or adjusted under 35 U.S.C. 154(b) by 274 days.

(21) Appl. No.: 15/252,961

(22) Filed: Aug. 31, 2016

(65) Prior Publication Data

US 2016/0369489 A1 Dec. 22, 2016

Related U.S. Application Data

(63) Continuation-in-part of application No. 14/696,067, filed on Apr. 24, 2015.
(Continued)

(51) Int. Cl.
  *B01D 29/01* (2006.01)
  *B01D 29/58* (2006.01)
  (Continued)

(52) U.S. Cl.
  CPC .............. *C02F 1/688* (2013.01); *B01D 29/01* (2013.01); *B01D 29/58* (2013.01); *B01D 35/02* (2013.01);
  (Continued)

(58) Field of Classification Search
  CPC .. B01D 29/0095; B01D 29/018; B01D 29/01; B01D 29/05; B01D 29/055; B01D 29/56; B01D 29/58; B01D 29/96; B01D 35/02; B01D 35/30; B01D 37/025; B01D 27/08; B01D 27/14; B01D 27/146; B01F 1/0033; B01F 1/0027; B01F 2001/0055; B01F 3/12; B01F 2003/125; C02F 1/001; C02F 1/685; C02F 1/687; C02F 1/688;
  (Continued)

(56) References Cited

U.S. PATENT DOCUMENTS 3,773,180 A * 11/1973 Harrison .............. B01D 29/055
  210/315
4,662,387 A  5/1987 King
(Continued)

*Primary Examiner* — Lucas A Stelling
(74) *Attorney, Agent, or Firm* — PatentFile, LLC; Bradley C. Fach; Steven R. Kick

(57) ABSTRACT

In some embodiments, a water straining and chemical additive device may include a filter body having a wall inflow surface, a central aperture, and a peripheral aperture. A return water tube having a tube outflow surface and a tube inflow surface may be coupled to the filter body. An inflow conduit may be in fluid communication with the peripheral aperture, and the inflow conduit may be formed by the wall inflow surface and the tube inflow surface. An inflow filter screen may be coupled to the peripheral aperture. A filter cap forming a primary cavity in fluid communication with the central aperture and the peripheral aperture may be coupled to the filter body. An outflow filter screen may be coupled to the central aperture. An outflow conduit may be in fluid communication with the central aperture, and the outflow conduit may be formed by the tube outflow surface.

20 Claims, 10 Drawing Sheets

Related U.S. Application Data

(60) Provisional application No. 61/987,681, filed on May 2, 2014.

(51) Int. Cl.

| | | |
|---|---|---|
| *B01D 35/02* | (2006.01) | |
| *B01D 35/30* | (2006.01) | |
| *B01D 37/02* | (2006.01) | |
| *B01F 1/00* | (2006.01) | |
| *C02F 1/00* | (2006.01) | |
| *C02F 1/68* | (2006.01) | |
| *C03B 7/07* | (2006.01) | |
| *E03C 1/046* | (2006.01) | |
| *E03D 9/02* | (2006.01) | |
| *E03B 7/07* | (2006.01) | |
| *C02F 103/00* | (2006.01) | |

(52) U.S. Cl.
CPC ........... *B01D 35/30* (2013.01); *B01D 37/025* (2013.01); *B01F 1/0027* (2013.01); *B01F 1/0033* (2013.01); *C02F 1/001* (2013.01); *C02F 1/687* (2013.01); *E03B 7/07* (2013.01); *E03C 1/046* (2013.01); *E03D 9/022* (2013.01); *B01D 29/018* (2013.01); *B01F 2001/0055* (2013.01); *C02F 2103/008* (2013.01); *C02F 2201/008* (2013.01); *C02F 2303/02* (2013.01); *C02F 2307/14* (2013.01); *E03D 2009/024* (2013.01)

(58) Field of Classification Search
CPC .......... C02F 2103/008; C02F 2201/008; C02F 2303/02; C02F 2307/14; E03B 7/07; E03C 1/046; E03D 9/022; E03D 2009/024
See application file for complete search history.

(56) References Cited

U.S. PATENT DOCUMENTS

| | | | |
|---|---|---|---|
| 4,873,727 | A | 10/1989 | Homan |
| 5,218,983 | A | 6/1993 | King |
| 5,778,459 | A | 7/1998 | Guerin |
| 5,881,396 | A | 3/1999 | Rivera |
| 6,240,572 | B1 | 6/2001 | der et al. |
| 6,295,657 | B1 | 10/2001 | Prue |
| 6,397,879 | B1 | 6/2002 | Ring et al. |
| 7,000,655 | B2 | 2/2006 | Garvin et al. |
| 7,081,232 | B1 | 7/2006 | Dooley et al. |
| 2003/0085239 | A1* | 5/2003 | Crain .................. B01F 1/0027 222/52 |
| 2004/0020843 | A1* | 2/2004 | Collier ................ B01D 35/30 210/443 |
| 2012/0125867 | A1* | 5/2012 | Andersen ............ B01D 35/02 210/791 |
| 2014/0014567 | A1 | 1/2014 | Boodaghians et al. |

* cited by examiner

WATER STRAINING AND CHEMICAL ADDITIVE DEVICE FOR MARINE VESSELS AND RECREATIONAL VEHICLES

CROSS REFERENCE TO RELATED APPLICATIONS

This application is a continuation-in-part of U.S. Non-Provisional application Ser. No. 14/696,067, filed on Apr. 24, 2015, entitled "WATER STRAINING AND CHEMICAL ADDITIVE DEVICE FOR MARINE VESSELS AND RECREATIONAL VEHICLES", which claims the benefit of U.S. Provisional Patent Application Ser. No. 61/987,681, filed on May 2, 2014, entitled "WATER STRAINING AND CHEMICAL ADDITIVE DEVICE FOR MARINE VESSELS AND RECREATIONAL VEHICLES", the entire disclosures of which are incorporated by reference herein.

FIELD OF THE INVENTION

This patent specification relates to the field of marine and portable toilet deodorizing devices capable of attaching to a wide variety of inline water strainers. More specifically, this patent specification relates to a device that is able to removably attach to various commercial inline water filters and strainers providing a mounting point and interface for deodorizing water soluble chemical additives while also providing straining capabilities to water entering a tankless or portable toilet system.

BACKGROUND

Outdoor sports and recreation enthusiasts have long sought to bring modern conveniences into their recreational vehicles. One such convenience is the toilet or commode. Due to the confined space and fresh water available in recreational and marine vehicles, toilet systems that are small and require limited water consumption have become very popular.

The tankless toilet system has been widely adopted by the marine and recreational vehicle market. This type of system does not utilize a tank located above the toilet that uses gravity to empty its contents into the toilet bowl in order to flush and clean the bowl. In a tankless toilet system, flushing is accomplished by the activation of a pumping motor or hand pump that forces water into the toilet bowl thereby providing the necessary flushing and cleaning action.

Often the water that is used to flush the tankless toilet is found in nature and contains various amounts of impurities, marine organisms, and particulate matter. Water strainers are used to filter out particulate matter that may clog the pump motor or the water passage ways of the tankless toilet system. Popular strainer systems utilize a screen or mesh filter that is located in the water line supplying the pump motor. Although useful, this inline strainer system is unable to address low purity water and the associated odors and residues it leaves behind.

Toilet bowl sanitizing mechanisms and apparatuses are known in the art. These mechanisms often reside in the toilet and provide a chamber where deodorants and chemicals are able to dissolve in the water passing through the toilet, see for example U.S. Pat. No. 6,240,572 filed on Feb. 11, 2000 by Van Der Gaag et al. These systems allow for the addition of chemicals, detergents, disinfectants, soaps, deodorizers, and coloring agents which reduce water odor and fouling of components encountered when using fresh water and salt water from the environment.

Separate water strainer and chemical additive systems offer many disadvantages. They require a greater amount of space, increased spare parts inventories, and the maintenance and cleaning of both systems. Unified water strainer and chemical additive systems are known in the art, see for example U.S. Pat. No. 4,873,727 filed on May 15, 1987 by Homan et al. Since many recreational vehicles and marine vessels are originally supplied to the customer without a chemical additive system, the installation of a new system requires further labor and costs to the boat owner. In addition, removing the old assembly from the water line and replacing it with a unified system frequently introduces points of weakness that may break and result in water damage and further repair costs to the marine vessel or recreational vehicle.

What is needed in the art is a unified water straining and chemical additive system for marine vessel and recreational vehicles that is easy to install and simple to operate.

Therefore, a need exists for novel marine and portable toilet deodorizing devices capable of attaching to a wide variety of inline water strainers. There is a further need for an apparatus that is able to removably attach to various commercial inline water filters and strainers providing a mounting point and interface for deodorizing water soluble chemical additives while also providing straining capabilities to water entering a tankless or portable toilet system. Finally, there exists a need for a unified water straining and chemical additive system for marine vessel and recreational vehicles that is easy to install and simple to operate.

BRIEF SUMMARY OF THE INVENTION

A water straining and chemical additive device is provided which may be used with a fluid such as water. In some embodiments, the device may include a filter body having a wall inflow surface, a central aperture, and a peripheral aperture. A return water tube having a tube outflow surface and a tube inflow surface may be coupled to the filter body. An inflow conduit for receiving the fluid may be in fluid communication with the peripheral aperture, and the inflow conduit may be formed by the wall inflow surface and the tube inflow surface. An inflow filter screen may be coupled to the peripheral aperture. A filter cap forming a primary cavity in fluid communication with the central aperture and the peripheral aperture may be coupled to the filter body. An outflow filter screen may be coupled to the central aperture. An outflow conduit for releasing the fluid from the device may be in fluid communication with the central aperture, and the outflow conduit may be formed by the tube outflow surface.

In further embodiments, the device may comprise a limiter forming a secondary cavity, and the secondary cavity may be in fluid communication with the central aperture and the peripheral aperture. A mixing aperture may be disposed in the limiter, and the mixing aperture may provide fluid communication between the primary cavity and the secondary cavity.

In still further embodiments, the limiter may comprise an adjustable control coupled to the mixing aperture, and the adjustable control governs the size of the mixing aperture.

In still further embodiments, the device may comprise a check valve disposed within the outflow conduit, and the check valve may block fluid communication from the outflow conduit to the inflow conduit.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
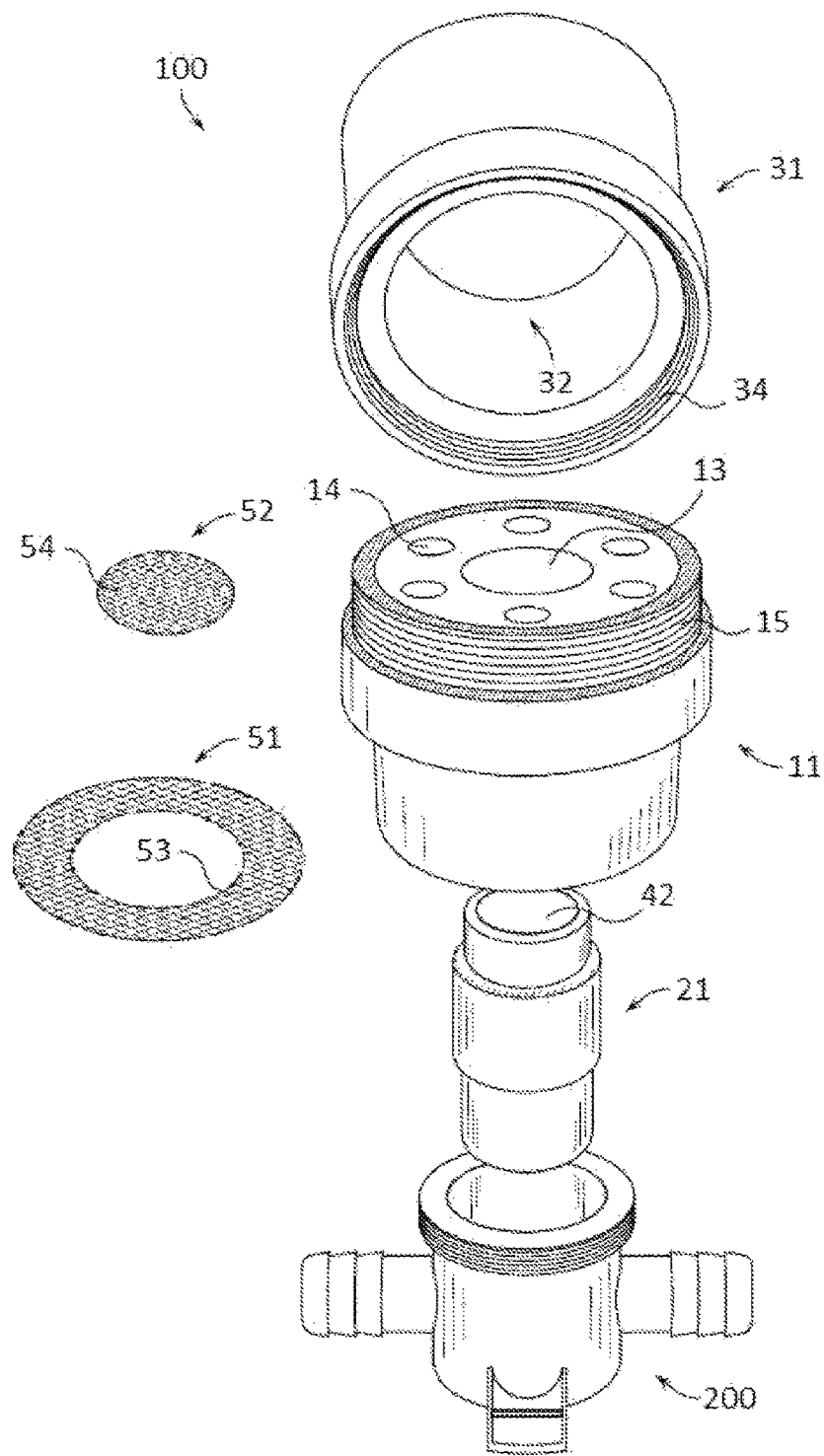
FIG. 1 depicts a perspective exploded view of an example of a water straining and chemical additive device shown with an exemplary in-line strainer system according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new device that is able to removably attach to various commercial inline water filters and strainers providing a mounting point and interface for deodorizing water soluble chemical additives while also providing straining capabilities to water entering a tankless or portable toilet system is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 2:
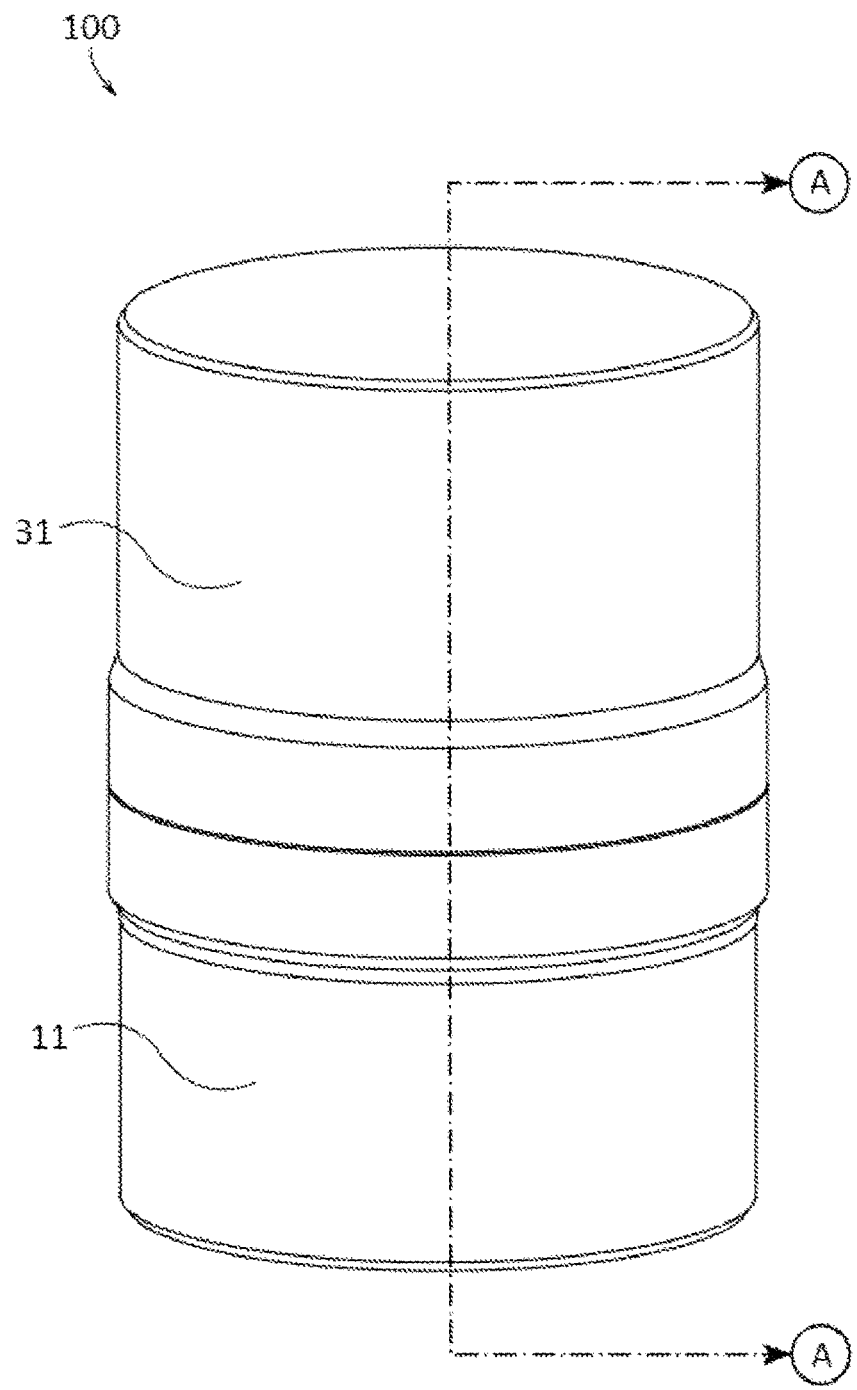
FIG. 2 illustrates a perspective view of an example of an assembled water straining and chemical additive device according to various embodiments described herein.

The present invention will now be described by example and through referencing the appended figures representing preferred and alternative embodiments. FIGS. 1 and 2 illustrate an example of a water straining and chemical additive device ("the device") 100 according to various embodiments. In preferred embodiments, the device comprises a filter body 11 that is capable of attaching to inline water strainers systems 200 through the mating of the filter body 11 anchor threads 16 with the base threads commonly found on commercial water straining systems 200 as are common with tankless toilets found in marine craft and may also be used in recreational vehicles housing a portable commode. The anchor threads 16 may comprise any suitable threading pattern which may be used to engage with a complementary threading commonly found on commercial water straining systems 200.

The device 100 may be used to strain and/or add a chemical additive to a fluid 300 (FIGS. 3 and 4), such as water, which may be conducted through the device 100. One non-limiting example of a commercially available water straining system 200 in which the device 100 may be removably connected to is the JABSCO® PumpGard® in-line strainer systems (example part nos. 36200-000, 36220-000, 36400-000, etc.) available from ITT Jabsco operating as Xylem Inc. of Foothill Ranch, Calif. USA although it is within the scope of this disclosure to include other inline water strainers and water delivery systems as well.

Figure 7:
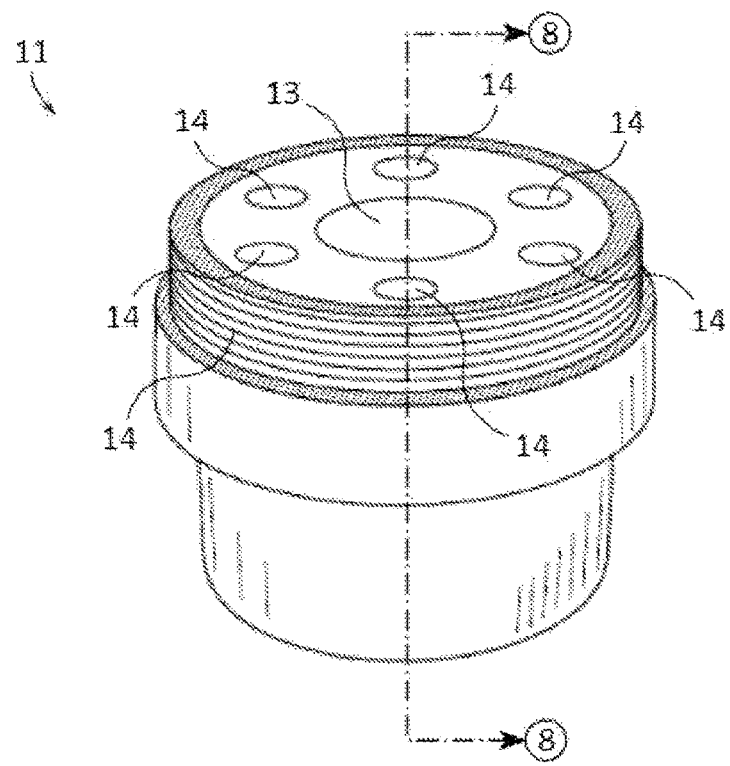
FIG. 7 depicts a top perspective view of an example of a filter body according to various embodiments described herein.

Referring now to FIGS. 1-4, in some embodiments, a water straining and chemical additive device 100 may comprise a return water tube 21 and a filter cap 31 which may both be coupled to the filter body 11. The return water tube 21 may occupy the central portion of the filter body 11 and physically separates the fluid 300 that is entering the device 100 from mixing with fluid 300 that is exiting the device 100. The filter body 11 may have a wall inflow surface 12, a central aperture 13, and one or more peripheral apertures 14. The return water tube 21 may comprise a tube outflow surface 22 and a tube inflow surface 23. The internal diameter of the filter body 11, formed by the wall inflow surface 12, and the outer diameter of the return water tube 21, formed by tube inflow surface 23, forms an inflow conduit 41 that directs fluid 300 entering the device 100 through an inflow filter screen 51 which may be coupled to one or more peripheral apertures 14. The peripheral apertures 14 may be located in a radial configuration around the return water tube 21 within the filter body 11. In some embodiments, between one and twenty (but preferably between two and ten and more preferably between 4 and 8) peripheral apertures 14 which may be of identical or various diameters and shapes (but preferably identical round openings as shown by FIGS. 1 and 7) are located in the filter body 11. The number and diameter of the peripheral apertures 14 will generally depend on the amount of fluid 300 that is required to pass through the device 100.

Figure 3:
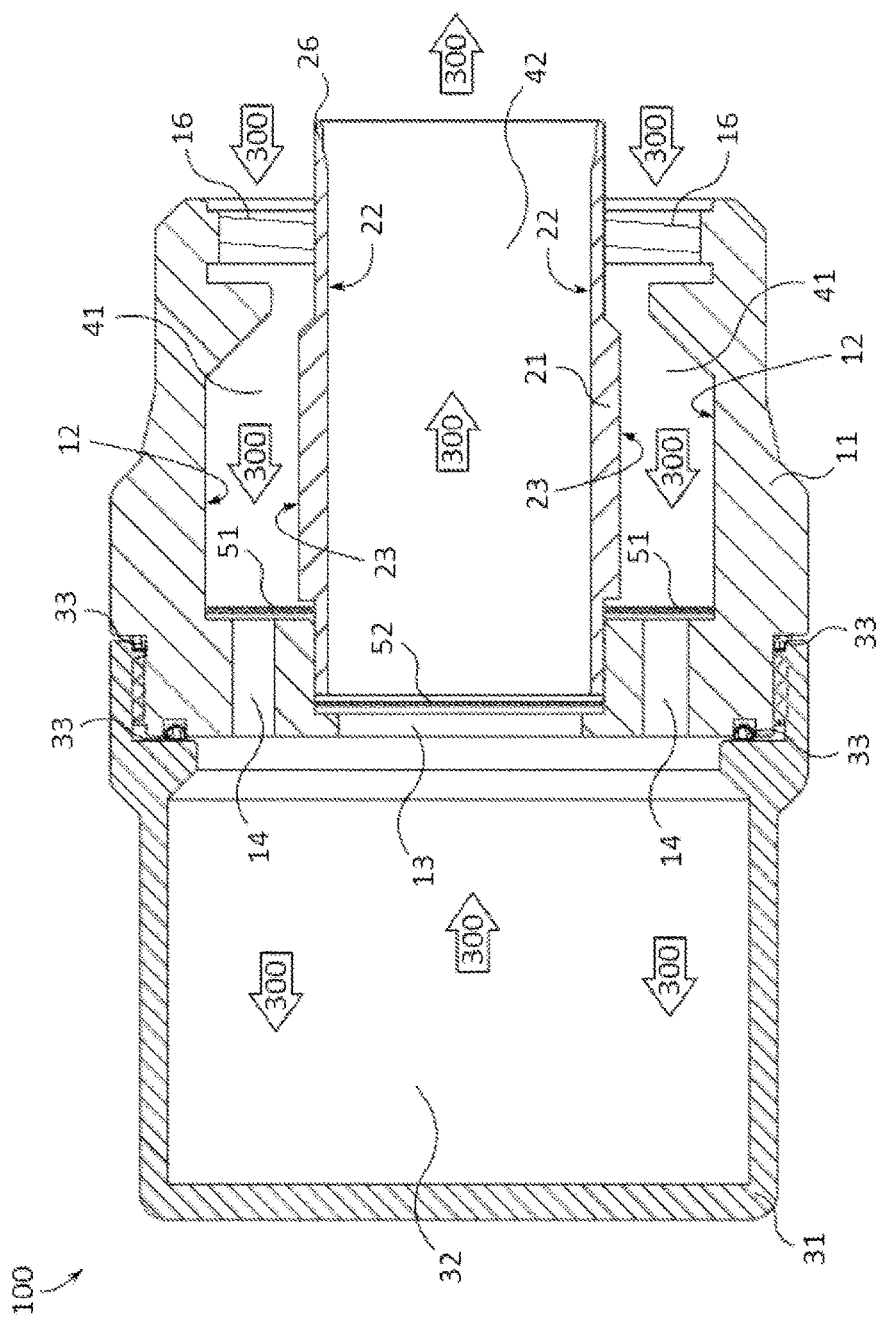
FIG. 3 shows a sectional, through line A-A shown in FIG. 2, elevation view of an example of a water straining and chemical additive device according to various embodiments described herein.
Figure 4:
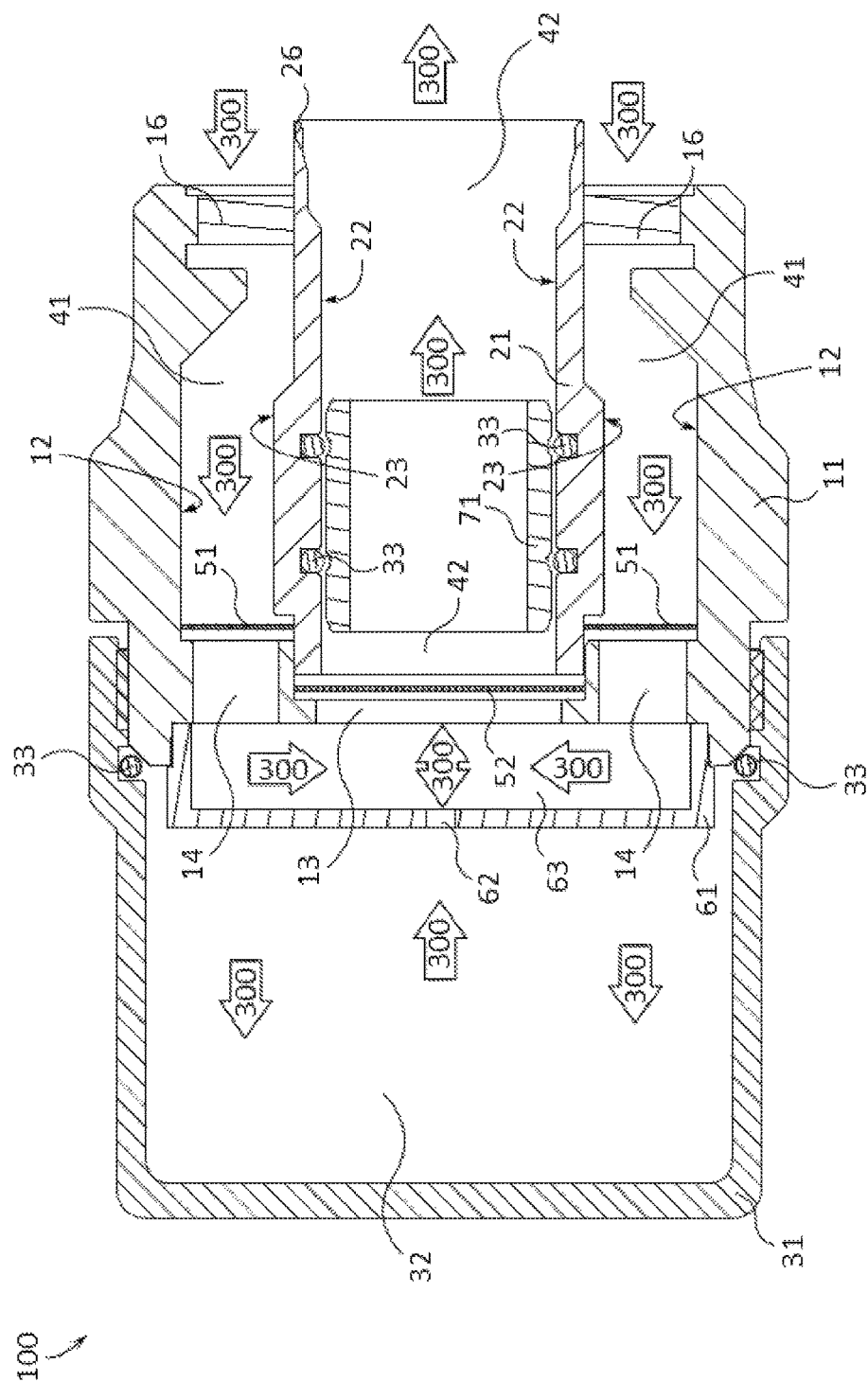
FIG. 4 depicts a sectional, through line A-A shown in FIG. 2, elevation view of an alternative example of a water straining and chemical additive device according to various embodiments described herein.

In some embodiments and as shown in FIG. 3, after passing through the inflow filter screen and a peripheral aperture 14, the fluid 300 may enter a primary cavity 32 formed between the filter cap 31 and the filter body 11. In further embodiments and as shown in FIG. 4, the device 100 may comprise an optional limiter 61 having a mixing aperture 62 and after passing through a peripheral aperture 14, the fluid 300 may enter an optional secondary cavity 63 formed between the limiter 61 and the filter body 11 in addition to entering the primary cavity 32 formed between the filter cap 31, filter body 11, and the limiter 61.

Figure 5:
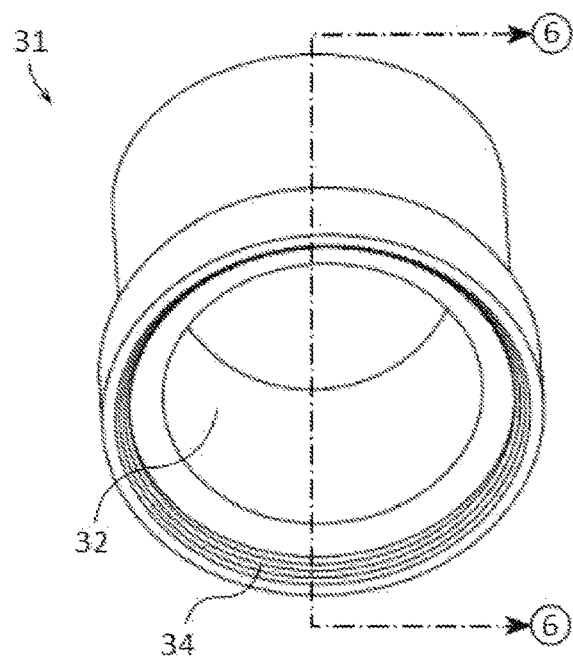
FIG. 5 illustrates a bottom perspective view of an example of a filter cap according to various embodiments described herein.
Figure 6:
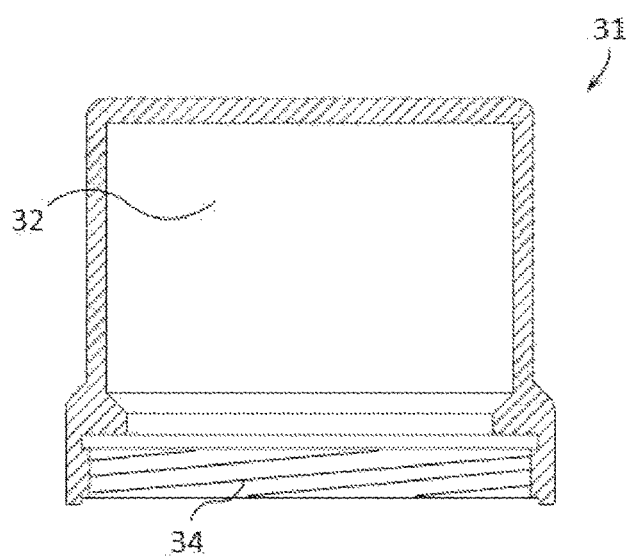
FIG. 6 shows a sectional, through line 6-6 shown in FIG. 5, elevation view of an example of a filter cap according to various embodiments described herein.
Figure 8:
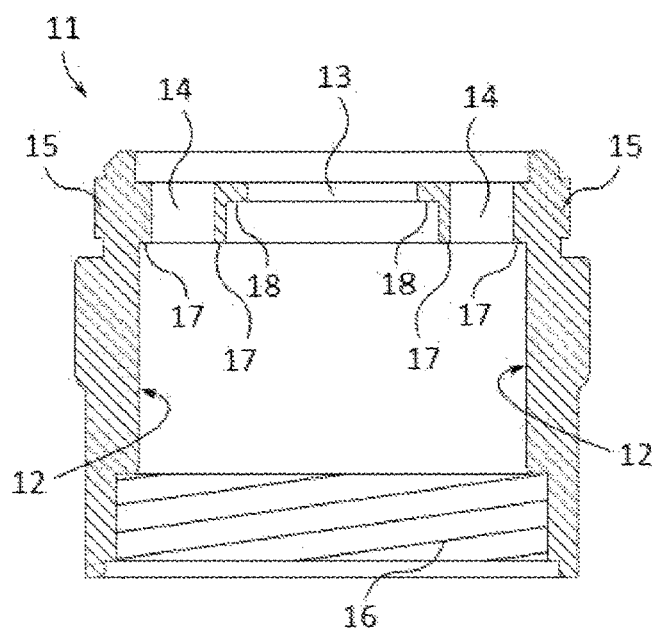
FIG. 8 illustrates a sectional, through line 8-8 shown in FIG. 7, elevation view of an example of a filter body according to various embodiments described herein.

To prevent leakage of water from the junction of the filter cap 31 and the filter body 11, one or more connection members such as a rubber o-ring 33 or gasket may be optionally be employed within the device 100. In some embodiments, the o-ring 33 or gasket may be internally located from cap mating threads 15 (FIGS. 7 and 8) on the filter body 11 and filter body mating threads 34 (FIGS. 5 and 6) on the filter cap 31, while in other embodiments an external o-ring 33 or gasket may be located externally after the cap mating threads 15 and filter body mating threads 34. In still further embodiments, both an internal o-ring 33 and an external o-ring 33 or gaskets may be used to prevent water leakage from the assembled device 100. In some alternative embodiments, the device may not utilize an o-ring 33 or gasket.

Figure 12:
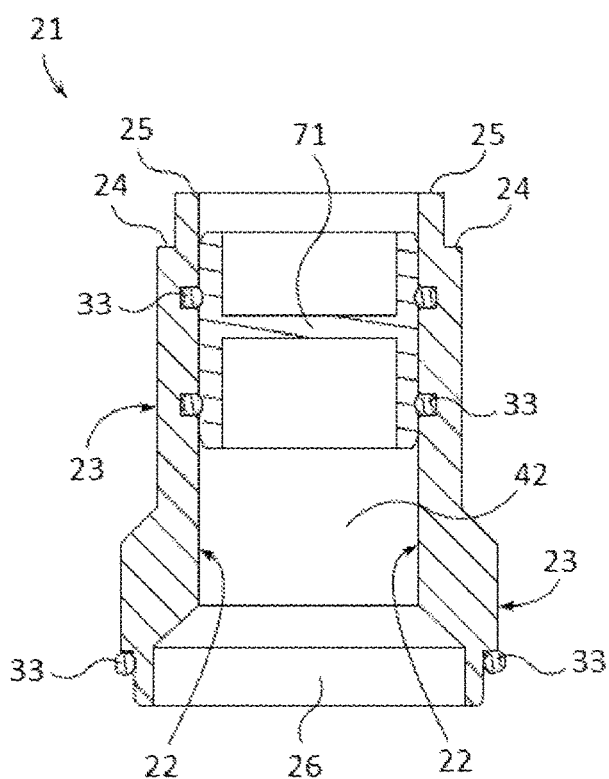
FIG. 12 shows a sectional, through line 12-12 shown in FIG. 11, elevation view of an alternative example of a return water tube according to various embodiments described herein.
Figure 13:
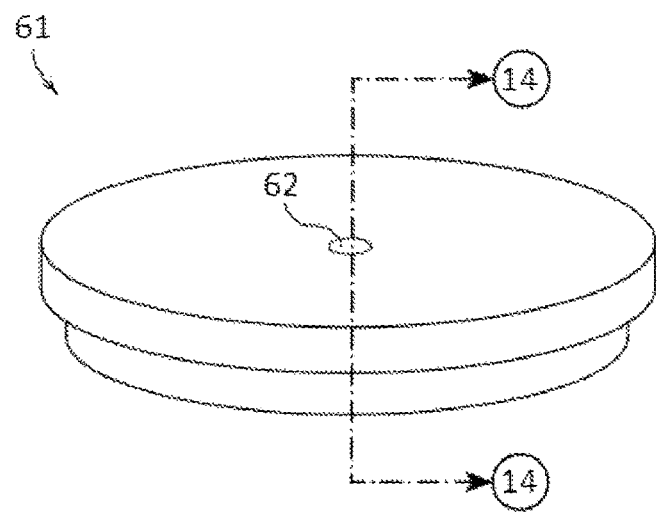
FIG. 13 depicts a perspective view of an example of a limiter according to various embodiments described herein.
Figure 14:
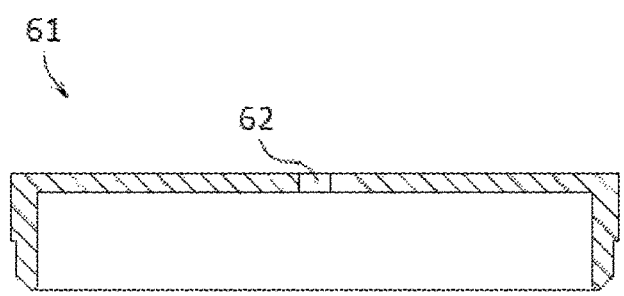
FIG. 14 illustrates a sectional, through line 14-14 shown in FIG. 13, elevation view of an example of a limiter according to various embodiments described herein.

The fluid 300 may then exit the primary cavity 32 and/or secondary cavity 63 by way of a central aperture 13 formed in the filter body 11. An outflow filter screen 52 may be coupled to the central aperture 13 which may govern the fluid communication of the fluid 300 into an outflow conduit 42 formed by the tube outflow surface 22 of the return water tube 21. In some embodiments and as shown in FIG. 3, once the fluid 300 enters the outflow conduit 42 it may then be directed out of the device 100 and preferably into a commercial water straining system 200 coupled to the filter body 11. In other embodiments and as shown in FIGS. 4 and 12, the device 100 may comprise a check valve 71 which may be coupled within the outflow conduit 42 of the return water tube 21, optionally with one or more o-rings 33, and which may prevent the fluid 300 from back flowing through the outflow filter screen 52. Once the fluid 300 enters the outflow conduit 42 it may then be directed through the check valve 71 and then out of the device 100 and preferably into a commercial water straining system 200 coupled to the filter body 11.

Turning now to FIGS. 1, 3-6, the filter cap 31 provides a primary cavity 32 or substantially hollow chamber capable of holding fluid 300 and a chemical additive. When the filter cap 31 is coupled to the filter body 11 the primary cavity 31 may be in fluid communication with the central aperture 13 and the one or more peripheral apertures 14 thereby allowing the fluid 300 passing through the device 100 to dissolve and accept some of the chemical additive. The chemical additive may comprise commercially available chemicals, detergents, disinfectants, soaps, deodorizers, and even coloring agents. In some embodiments, the chemical additive may be formulated in tablet or cartridge form. In some embodiments, the filter cap 31 may terminate at its distal end, the end furthest from the filter body 11 in a smaller diameter or height in order to accommodate smaller sized commercially available chemical cartridges or tablets. In other embodiments, the filter cap 31 may terminate at its distal end in a diameter that is larger than the diameter of the filter body 11 or comprise a greater height to accommodate larger sized commercially available chemical cartridges or tablets.

In some embodiments, the filter cap 31 may be removably coupled to the filter body 11 with threading. The filter cap 31 may comprise one or more filter body mating threads 34 and the filter body 11 may comprise one or more cap mating threads 15. The mating threads 34, 15, may be mated or engaged together thereby removably coupling the filter cap 31 to the filter body 11. In other embodiments, one or more fasteners, such as screws, bolts, studs, other threaded fasteners, clamps, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the function of removably coupling the filter cap 31 to the filter body 11.

In preferred embodiments, both the filter body 11 and the filter cap 31 may each comprise a generally cylindrical shape so that when coupled together as shown in FIG. 2, the device 100 may be configured with a cylinder shape. In alternative embodiments, the filter body 11 and/or the filter cap 31 may be configured in a plurality of sizes and shapes including "T" shaped, "I" shaped, square shaped, rectangular shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Referring now to FIGS. 4, 13-16, in some embodiments, the device 100 may comprise an optional limiter 61 which may be coupled to the filter body 11 and/or to the filter cap 31 and which may form a secondary cavity 63 which may be between or separate the primary cavity 32 from the central aperture 13 and from one or more peripheral apertures 14. In this manner, the secondary cavity 63 may be in fluid communication with the central aperture 13 and one or more peripheral apertures 14. The limiter 61 may comprise one or more mixing apertures 62 which may enable fluid 300 to pass through the limiter 61. The one or more mixing apertures 62 may enable fluid communication between the primary cavity 32 and secondary cavity 63 and therefore between the primary cavity 32 and the central aperture 13 and one or more peripheral apertures 14. By increasing the size and/or number of mixing apertures 62 in the limiter 61, the fluid communication between the primary cavity 32 and the secondary cavity 63 may be increased. Conversely, by decreasing the size and/or number of mixing apertures 62 in the limiter 61, the fluid communication between the primary cavity 32 and the secondary cavity 63 may be decreased. In this manner the limiter 61 may govern the amount of fluid 300 contacting a water soluble chemical additive within the primary cavity 32.

Figure 15:
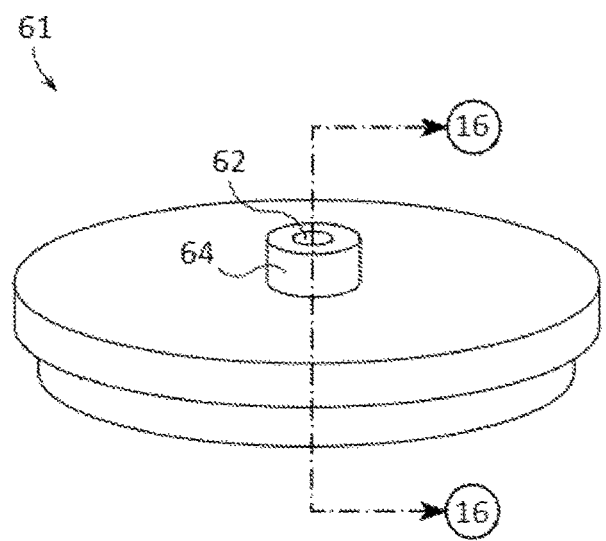
FIG. 15 shows a perspective view of an alternative example of a limiter according to various embodiments described herein.
Figure 16:
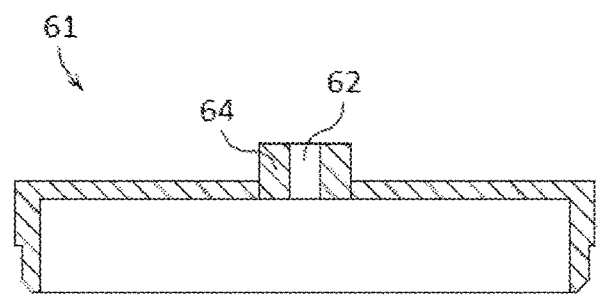
FIG. 16 depicts a sectional, through line 16-16 shown in FIG. 15, elevation view of an alternative example of a limiter according to various embodiments described herein.

In further embodiments and as shown in FIGS. 15 and 16, the limiter 61 may optionally comprise an adjustable control 64 which may be coupled to one or more mixing apertures 62. Preferably, an adjustable control 64 may be configured to govern the size of one or more mixing apertures 62 thereby governing the amount of fluid communication between the primary cavity 32 and the secondary cavity 63. By increasing the size of a mixing aperture 62, the fluid communication between the primary cavity 32 and the secondary cavity 63 may be increased. Conversely, by decreasing the size of a mixing aperture 62, the fluid communication between the primary cavity 32 and the secondary cavity 63 may be decreased. In this manner the adjustable control 64 may further govern the amount of fluid 300 contacting a water soluble chemical additive within the primary cavity 32.

An adjustable control 64 may comprise any device suitable for changing the size and/or shape of a mixing aperture 62. For example, portions of an adjustable control 64 may be movably coupled, such as slidably coupled or pivotally coupled, to the limiter 61 so that portions of the adjustable control 64 may be moved over a mixing aperture 62 to decrease the size and/or shape of a mixing aperture 62 and the portions of the adjustable control 64 may be removed from over a mixing aperture 62 to increase the size and/or shape of a mixing aperture 62.

As perhaps best shown in FIGS. 1, 3, and 4, the device 100 may comprise an inflow filter screen 51 and/or an outflow filter screen 52. An optional inflow filter screen 51 may be coupled within the inflow conduit 41 and/or to one or more peripheral apertures 14 so that prior to entering the primary cavity 32 and optional secondary cavity 63, the fluid 300 must first pass through the inflow filter screen 51. The inflow filter screen 51 may be of a substantially ring shape and may be secured within the device 100 upstream of the peripheral apertures 14 along the inflow filter screen inner circumference 53 (FIG. 1). In some embodiments, the filter body 11 may comprise a body inflow lip 17 (FIG. 8) and the return water tube 21 may comprise a tube inflow lip 24 (FIGS. 9-12), and the inflow filter screen 51 may be coupled between the body inflow lip 17 and the tube inflow lip 24.

An optional outflow filter screen 52 may be coupled to the central aperture 13 so that prior to entering the outflow conduit 42, the fluid 300 must first pass through the outflow filter screen 52. The outflow filter screen 52 may be of a substantially circular shape and may be secured within the device 100 downstream of the central aperture 15 along the outflow filter screen outer circumference 54 (FIG. 1). In some embodiments, the filter body 11 may comprise a body outflow lip 18 (FIG. 8) and the return water tube 21 may comprise a tube outflow lip 25 (FIGS. 9-12), and the outflow filter screen 52 may be coupled between the body outflow lip 18 and the tube outflow lip 25.

In some embodiments, the outflow filter screen 52 and the inflow filter screen 51 may be made of or comprise a plastic mesh with openings sufficient in size to allow fluid 300, such as water, to freely pass through while blocking particulate debris such as aquatic plants, chunks of wood, trash or other items commonly found in salt or fresh waterways. In other embodiments, the outflow filter screen 52 and the inflow filter screen 51 may be made of or comprise stainless steel, copper, bronze, brass, zinc plated steel, or other suitable materials and metal alloys common in the art of filter screens and selected based on the chemical makeup of the fluid 300 passing through the screens 51, 52.

Figure 9:
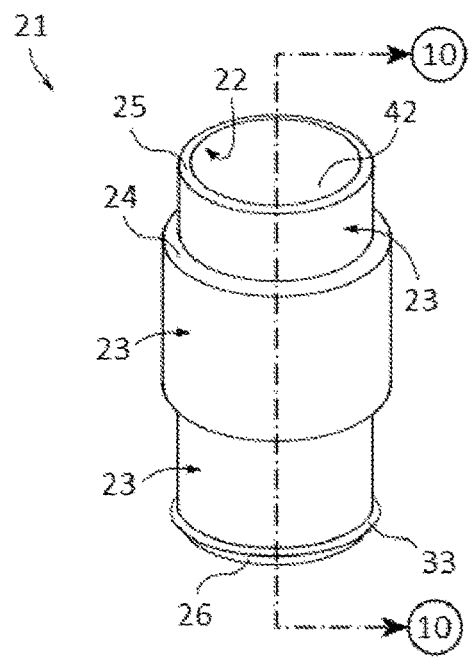
FIG. 9 shows a perspective view of an example of a return water tube according to various embodiments described herein.
Figure 10:
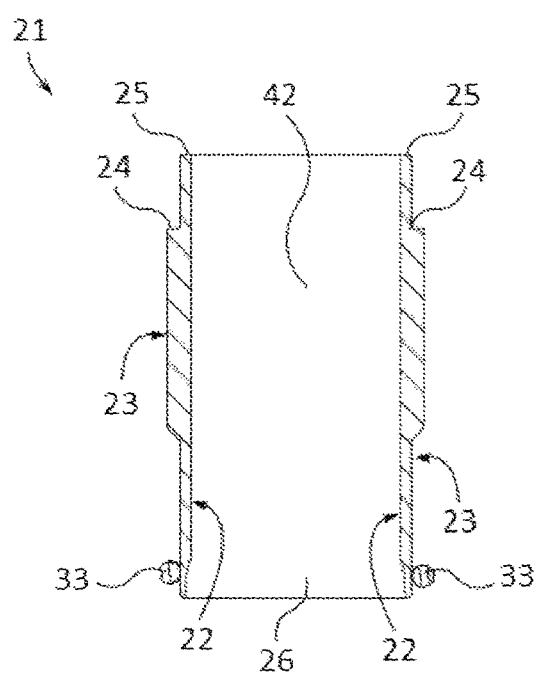
FIG. 10 depicts a sectional, through line 10-10 shown in FIG. 9, elevation view of an example of a return water tube according to various embodiments described herein.
Figure 11:
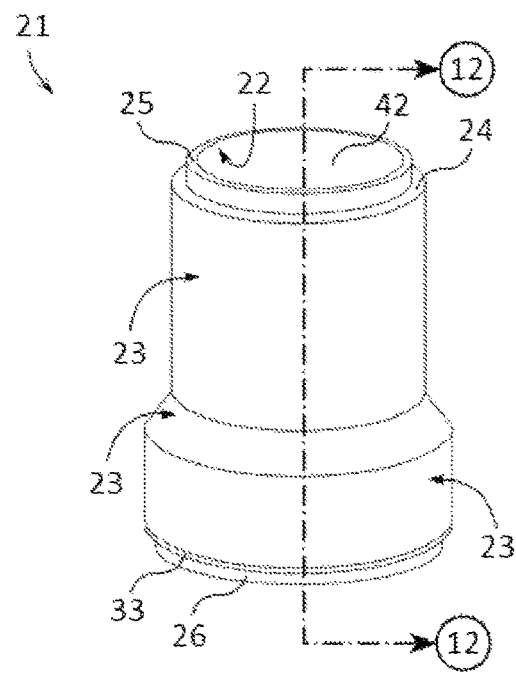
FIG. 11 illustrates a perspective view of an alternative example of a return water tube according to various embodiments described herein.

Referring to FIGS. 9-12, two example return water tubes 21 are depicted. A return water tube 21 may comprise a generally hollow cylindrical shape. The tube outflow surface 22 may form the interior of the return water tube 21 and also form portions of the outflow conduit 42 (FIGS. 3 and 4). The tube inflow surface 23 may form portions of the exterior of the return water tube 21 and also form portions of the inflow conduit 41 (FIGS. 3 and 4). A tube inflow lip 24 may be formed into the tube inflow surface 23 which may be used to secure portions of the inflow filter screen 51 along its inflow filter screen inner circumference 53 as shown in FIGS. 3 and 4. A tube outflow lip 25 may be formed into the return water tube 21 which may form a boundary between the tube outflow surface 22 and the tube inflow surface 23. The tube outflow lip 25 may be used to secure portions of the outflow filter screen 52 along its outflow filter screen outer circumference 54 as shown in FIGS. 3 and 4. Additionally, the return water tube 21 may comprise a tube base 26 which may be coupled to portions of any available commercial water straining system 200 (FIG. 1). The tube base 26 may be configured in any size and shape, such as a relatively smaller cylindrical shape as shown in FIGS. 3, 9, and 10 or a relatively larger cylindrical shape as shown in FIGS. 4, 11, and 12, thereby allowing the tube base 26 to be mated with a complementarily shaped portion of a commercial water straining systems 200.

The return water tube 21, filter body 11, and the filter cap 31 may be made of any type of plastic, glass, or metal that is common in the art of fresh water and salt water recreational vehicle plumbing systems. In some embodiments, the return water tube 21 and the filter body 11 are made of a plastic such as polyvinyl chloride, while the filter cap 31 may be made of a plastic such as polycarbonate resin thermoplastic or polyvinyl chloride. In some embodiments, the filter cap 31 may be made from a clear or transparent plastic. In other embodiments, the return water tube 21 and the filter body 11 may be made of or comprise a metal such as brass or bronze, while the filter cap 31 may be made from or comprise a clear glass or plastic resin.

Also as shown in the examples of FIGS. 9-12, in some embodiments, the device may comprise one or more o-rings 33 which may be positioned on or in contact with the water return tube 21. An o-ring 33 may be positioned anywhere on a water return tube 21 such as on the tube inflow surface 23 optionally proximate to the tube base 26. In further embodiments, an o-ring 33 may be positioned on the tube outflow surface 22 optionally proximate to the tube base 26. In still further embodiments, an o-ring 33 may be positioned anywhere else on a water return tube 21 and/or the filter body 11 to facilitate or provide a water tight seal between the water return tube 21 and/or the filter body 11 and a commercial water straining systems 200 to which the device may be coupled to.

As illustrated in FIGS. 3 and 4, portions of the tube inflow surface 23 and wall inflow surface 12 may form the inflow conduit 41, while portions of the tube outflow surface 22 may form the outflow conduit 42 when the filter body 11 and return water tube 21 are coupled together. When the device 100 is coupled to a commercial water straining system 200 (FIG. 1), such as by coupling the filter body 11 and return water tube 21 to a commercial water straining system 200, fluid 300 may enter the device 100 through the inflow conduit 41 and exit the device through the outflow conduit 42 via the commercial water straining system 200.

In preferred embodiments, the return water tube 21, filter cap 31, and the filter body 11 may each be formed in a cylinder shape, with the return water tube 21 positioned centrally within the filter body 11 so that the outflow conduit 42 may be disposed centrally within the inflow conduit 41. Additionally, the central aperture 13 may be positioned centrally within the filter body 11 in fluid communication with the outflow conduit 42 and one, two, three, four, five, six, seven, or more peripheral apertures 14 may be radially positioned around the central aperture 13 thereby allowing the peripheral apertures 14 to be in fluid communication with the inflow conduit 41. In further embodiments, the device may comprise a plurality, such as two, three, four, five, six, seven, eight, or more, of peripheral apertures 14 with each peripheral aperture 14 in fluid communication with the inflow filter screen 51 and the inflow conduit 41. In still further embodiments, the return water tube 21 and therefore the outflow conduit 42 may be positioned centrally in the cylinder shape formed by the filter cap 31 and the filter body 11 with the peripheral apertures 14 positioned around, such as radially around, the central aperture 13.

As perhaps best shown in FIGS. 4 and 12, in some embodiments, the device 100 may comprise one or more optional check valves 71 which may only enable fluid communication in one direction through all or portions of the device 100. A check valve 71, also called a clack valve, non-return valve or one-way valve, is a valve that normally allows fluid 300 to flow through it in only one direction. Generally, check valves 71 are two-port valves, meaning they have two openings in the body, one for fluid 300 to enter and the other for fluid 300 to leave. A check valve 71 may be or comprise any suitable type of check valve such as a ball check valve, diaphragm check valve, swing check valve or tilting disc check valve, stop-check valve, lift-check valve, in-line check valve, duckbill valve, or any other type of check valve. Optionally, one or more o-rings 33 may be used to position and or form a fluid-tight seal between the check valve 71 and an element that the check valve 71 is positioned in contact with such as the tube outflow surface 22 of the return water tube 21.

In preferred embodiments, a check valve 71 may be disposed within the outflow conduit 42 and the check valve 71 may block fluid communication from the outflow conduit 42 to the inflow conduit 41 preferably by blocking the backflow of fluid 300 from the outflow conduit 42 through the central aperture 13. In alternative embodiments, a check valve 71 may be disposed within the inflow conduit 41 and the check valve 71 may block fluid communication from the outflow conduit 42 to the inflow conduit 41 preferably by blocking the backflow of fluid 300 out of the inflow conduit 41.

While some materials have been provided, in other embodiments, the elements that comprise the device 100 such as the filter body 11, return water tube 21, filter cap 31, optional inflow filter screen 51, optional outflow filter screen 52, optional limiter 61, check valve 71, and/or any other element discussed herein may be made from or comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An additive injection and straining device for use with a fluid, the device comprising:
   a filter body having a wall inflow surface, a central aperture, and a peripheral aperture;
   a return water tube coupled to the filter body, wherein the return water tube; comprises a tube outflow surface and a tube inflow surface;
   an inflow conduit for receiving the fluid, wherein the inflow conduit is in fluid communication with the peripheral aperture, and wherein the inflow conduit is formed by the wall inflow surface and the tube inflow surface;
   an inflow filter screen coupled to the peripheral aperture;
   a filter cap coupled to the filter body, wherein the filter cap forms a primary cavity in fluid communication with the central aperture and the peripheral aperture;
   an outflow filter screen coupled to the central aperture; and
   an outflow conduit for releasing the fluid from the device, wherein the outflow conduit is in fluid communication with the central aperture, and wherein the outflow conduit is formed by the tube outflow surface.

2. The device of claim 1, wherein the filter body comprises a body inflow lip, wherein the return water tube comprises a tube inflow lip, and wherein the inflow filter screen is coupled between the body inflow lip and the tube inflow lip.

3. The device of claim 1, wherein the filter body comprises a body outflow lip, wherein the return water tube comprises a tube outflow lip, and wherein the outflow filter screen is coupled between the body outflow lip and the tube outflow lip.

4. The device of claim 1, wherein the body comprises anchor threads.

5. The device of claim 1, wherein the body comprises cap mating threads, wherein the filter cap comprises filter body mating threads, and wherein the filter cap is removably coupled to the filter body by engaging the filter body mating threads with the cap mating threads.

6. The device of claim 1, further comprising a check valve disposed within the outflow conduit.

7. The device of claim 6, wherein the check valve blocks fluid communication from the outflow conduit to the inflow conduit.

8. The device of claim 1, further comprising a plurality of peripheral apertures, wherein each peripheral aperture is in fluid communication with the inflow filter screen and the inflow conduit.

9. The device of claim 1, wherein the filter cap and the filter body are formed in a cylinder shape.

10. The device of claim 9, wherein outflow conduit is positioned centrally in the cylinder shape formed by the filter cap and the filter body.

11. An additive injection and straining device, the device comprising:
    a filter body having a wall inflow surface, a central aperture, and a peripheral aperture;
    a return water tube coupled to the filter body, wherein the return water tube; comprises a tube outflow surface and a tube inflow surface;
    an inflow conduit for receiving the fluid, wherein the inflow conduit is in fluid communication with the peripheral aperture, and wherein the inflow conduit is formed by the wall inflow surface and the tube inflow surface;
    an inflow filter screen coupled to the peripheral aperture;
    a filter cap coupled to the filter body, wherein the filter cap forms a primary cavity;
    a limiter forming a secondary cavity, wherein the secondary cavity is in fluid communication with the central aperture and the peripheral aperture;
    a mixing aperture disposed in the limiter, wherein the mixing aperture provides fluid communication between the primary cavity and the secondary cavity;
    an outflow filter screen coupled to the central aperture; and
    an outflow conduit for releasing the fluid from the device, wherein the outflow conduit is in fluid communication with the central aperture, and wherein the outflow conduit is formed by the tube outflow surface.

12. The device of claim 11, wherein the limiter comprises an adjustable control coupled to the mixing aperture, and wherein the adjustable control governs the size of the mixing aperture.

13. The device of claim 11, wherein the filter body comprises a body inflow lip, wherein the return water tube comprises a tube inflow lip, and wherein the inflow filter screen is coupled between the body inflow lip and the tube inflow lip.

14. The device of claim 11, wherein the filter body comprises a body outflow lip, wherein the return water tube comprises a tube outflow lip, and wherein the outflow filter screen is coupled between the body outflow lip and the tube outflow lip.

15. The device of claim 11, wherein the body comprises cap mating threads, wherein the filter cap comprises filter body mating threads, and wherein the filter cap is removably coupled to the filter body by engaging the filter body mating threads with the cap mating threads.

16. The device of claim 11, further comprising a check valve disposed within the outflow conduit.

17. The device of claim 16, wherein the check valve blocks fluid communication from the outflow conduit to the inflow conduit.

18. The device of claim 11, further comprising a plurality of peripheral apertures, wherein each peripheral aperture is in fluid communication with the inflow filter screen and the inflow conduit.

19. The device of claim 11, wherein the filter cap and the filter body are formed in a cylinder shape.

20. The device of claim 19, wherein outflow conduit is positioned centrally in the cylinder shape formed by the filter cap and the filter body.

* * * * *